United States Patent Office 3,636,083
Patented Jan. 18, 1972

3,636,083
POLYMERIZABLE DERIVATIVE OF
NITRILOTRIACETIC ACID
Edward D. Weil, Yonkers, and Walter Stamm, Tarrytown, N.Y., and Stanley B. Mirviss, Stamford, Conn., assignors to Stauffer Chemical Company, New York, N.Y.
No Drawing. Filed Jan. 10, 1968, Ser. No. 696,705
Int. Cl. C07c 101/20
U.S. Cl. 260—482 P                1 Claim

ABSTRACT OF THE DISCLOSURE

A polymerizable composition of matter having the formula:

$$N[CH_2COOR]_3$$

wherein R is an unsaturated aliphatic radical selected from the group consisting of alkenyl, alkynyl, alkadienyl, cycloalkenyl and mixtures thereof, and wherein each group can have from 2 to 20 carbon atoms.

BACKGROUND OF THE INVENTION

The nitrilotriacetic compounds, such as nitrilotriacetonitrile, nitrilotriacetic acid and sodium nitrilotriacetate have long been known in the art. The nitrilotriacetonitrile can be manufactured by reacting ammonia and formaldehyde together in stoichiometric portions and thereafter in the presence of sulfuric acid, hydrogen cyanide and additional formaldehyde are reacted together to form nitrilotriacetonitrile. The sodium salt of the corresponding tricarboxylic acid may be formed by reacting sodium hydroxide with the nitrilotriacetonitrile to form sodium nitrilotriacetate. The acid itself can be formed by reacting the nitrilotriacetonitrile with an acid to form nitrilotriacetic acid. These compounds have wide utility as chelating agents.

BRIEF DESCRIPTION OF THE INVENTION

It has been discovered that trialkenyl esters of nitrilotriacetic acid can be prepared from the nitrilotriacetic acid which polymers have wide utility as resinous compositions. The compounds prepared in accordance with the present invention have the following structure:

$$N[CH_2COOR]_3$$

wherein R can be an unsaturated aliphatic radical selected from the group consisting of alkenyl, alkynyl, alkadienyl, cycloalkenyl and mixtures thereof, each having from 2 to 20 carbon atoms.

DETAILED DESCRIPTION OF THE INVENTION

The products of the present invention can be formed by reacting nitrilotriacetic acid with an alkenyl alcohol or ester or by reacting a salt of nitrilotriacetic acid with an alkenyl halide in the presence of heat and/or a catalyst. The reaction involving nitrilotriacetic acid may be effected without a solvent or by dissolving or slurrying the nitrilotriacetic acid in a suitable solvent such as methyl ethyl ketone, benzene, toluene, xylene, perchloroethylene, and the like. After the alkenyl compound is added to the nitrilotriacetic acid, it is heated in the presence of a catalyst. Conventional catalysts that can be employed are sulfuric acid, toluenesulfonic acid, acidic clay, acid ion exchange resins and the like where the alkenyl compound is an alcohol. Also usable are sodium, sodium carbonate, alkali hydroxide, alkali alkoxides, titanium alkoxide and the like when the alkenyl compound is an ester. The reaction between the nitrilotriacetic acid and the alkenyl alcohol or ester usually takes place at reflux temperatures within from 0.5 to 100 hours. The compositions produced are trialkenyl esters of nitrilotriacetic acid having the formula as heretofore set forth. Specific unsaturated aliphatic radicals that can be represented by the letter R in the above formula may be selected from the group consisting of vinyl, allyl, propenyl, methallyl, crotyl, hexenyl, octenyl, dodecenyl, octadecenyl, ethynyl, 1-propynyl, propargyl, 4-hexynyl, 1-octadecynyl, 1-butadienyl, 2-butadienyl, octa-7,9-dien-1-yl, decadienyl, octadecadienyl, eicosadienyl, 1-cyclopenten-1-yl, 1-cyclohexen-1-yl, 5-cyclooctadien-1-yl, 3-cycloocten-1-yl, 5,9-cyclododecadien-1-yl.

Trivinyl nitrilotriacetate can be produced by direct vinylation of nitrilotriacetic acid by acetylene in the presence of a vinylation catalyst such as cadmium chloride. Triallyl nitrilotriacetate can be produced either by direct esterification of the nitrilotriacetic acid by allyl alcohol in the presence of conventional esterification catalyst such as paratoluenesulfonic acid or by reaction of a salt of nitrilotriacetic acid with allyl chloride. Suitable salts such as sodium salt, potassium salt and the amine salts can be used.

The products of this invention are polymerizable by heating and/or by addition of free radical catalysts such as peroxide, azobisisobutyronitrile, and the like. They are copolymerizable with vinyl monomers and allyl monomers, exemplified by styrene, methylstyrene, acrylic acid, acrylate esters, acrylonitrile, vinyl chloride, vinylidene chloride, vinyl acetate, butadiene, isoprene, chloroprene, divinylbenzene, diallyl phthalate, triallyl citrate, diallyl tartrate, triallyl cyanurate, triallyl phosphate, as well as with sulfur dioxide, maleic anhydride, and dialkyl fumarates or maleates. The compounds of this invention can be used alone or together with other monomers such as styrene in the curing of unsaturated polyesters.

The compounds of this invention yield polymers and copolymers having a higher mechanical strength and resistance to separation of resins from fillers when used on substrates such as metals, wood, paper, glass and the like. Moreover, laminates and adhesive bonded joints made with resins made from the monomers of this invention are found to have improved mechanical strength.

In the event that it is desired to employ the trialkenyl esters of nitrilotriacetic acids of the present invention as chemical extenders for commercial epoxy resins, the composition of the present invention can be readily converted to epoxy compositions by treating the same with a conventional epoxidizing agent such as hydrogen peroxide, peracetic acid, perbenzoic acid, or hypochlorous acid plus base to convert the carbon to carbon double bond to an oxirane group to provide an epoxy resin intermediate. This can be brought about by merely treating the trialkenyl esters of the present invention with an epoxidizing agent in the presence of heat and/or catalyst as is conventional in the art. The epoxy composition so formed can be readily admixed with commercial epoxies or used as epoxy resins alone. Where four molar equivalents or peroxidic epoxidizing agent are used, the epoxy ester composition thus produced is an amine oxide rather than in amine.

In the alternative, the epoxy composition can be formed by directly reacting the sodium salts of nitrilotriacetic acid with epoxy alkyl chlorides such as epichlorohydrin if desired.

In order to illustrate the merits of this invention the following examples are provided:

Example 1

A solution of 1 mole (191 grams) of nitrilotriacetic acid in 500 milliliters of vinyl acetate was refluxed for nine hours in the presence of 2 grams of mercuric acetate and 0.2 milliliter of sulfuric acid as a catalyst and 1 gram of benzoquinone as polymerization inhibitor. The reaction mixture was then evaporated at room temperature under pump vacuum and the residual liquid was distilled at 40–50° C., in a short path vacuum still to obtain a colorless liquid of low viscosity. The product was identified as trivinyl nitrilotriacetate by nuclear magnetic resonance which showed a ratio of three vinylic protons, two at δ 4.5–5.0 (complex multiplet) and one at δ 7.2 (doublet of doublets), to two —CO—CH$_2$—N protons at δ 3.65 (singlet).

Example 2

To a mixture of 95.5 grams (0.5 mole) of nitrilotriacetic acid, 151.3 grams (1.5 mole) of triethylamine, and 200 ml. of methyl ethyl ketone at reflux temperatures was added 122 grams (1.6 mole) of allyl chloride dropwise over two hours. The mixture was then refluxed for ten hours until all the chlorine was digested. The reaction mixture was then filtered to remove a voluminous cake of triethylamine hydrochloride. The cake was washed with methyl ethyl ketone and the combined washings were then evaporated at 100° C., under vacuum. The residual clear liquid produced was found to distill at 191–2° C. (0.1 mm.). The product was identified as triallyl nitrilotriacetate by nuclear magnetic resonance which showed a ratio of three vinylic protons at δ 5.1–6.3 (complex multiplet), two —CH$_2$—O— protons at δ 4.6 (doublet with fine structure) and two —CO—CH$_2$—N protons at 3.65 (singlet).

Example 3

A mixture of 10 grams of trivinyl nitrilotriacetate of Example 1 and 25 grams of styrene and 1 gram of benzoyl peroxide were blended with 70 grams of a maleic-glycol polyester and the mixture used to impregnate a piece of glass cloth. The resin was then cured by heating at 120° C. for two hours. The glass cloth produced was compared to a glass cloth impregnated with the polyester cured by styrene only and upon bending of the cured laminate was found to exhibit far superior resistance to separation of resin from glass fibers than with the cloth impregnated with a resin crosslinked by styrene alone.

What is claimed is:
1. Trivinyl nitrilotriacetate.

References Cited

UNITED STATES PATENTS 3,278,478   10/1966   Masterson et al. __ 260—482 X

JAMES A. PATTEN, Primary Examiner

P. J. KILLOS, Assistant Examiner

U.S. Cl. X.R.

117—126 GR, 138.8 UA; 161—195; 260—2 EP, 39 R, 78 A, 348 A, 348.5 L